(12) United States Patent
Wakamoto

(10) Patent No.: US 10,741,089 B2
(45) Date of Patent: Aug. 11, 2020

(54) INTERACTIVE IMMERSION SYSTEM FOR MOVIES, TELEVISION, ANIMATION, MUSIC VIDEOS, LANGUAGE TRAINING, ENTERTAINMENT, VIDEO GAMES AND SOCIAL NETWORKING

(76) Inventor: Carl Wakamoto, Tarzana, CA (US)

( * ) Notice: Subject to any disclaimer, the term of this patent is extended or adjusted under 35 U.S.C. 154(b) by 0 days.

(21) Appl. No.: 13/251,287

(22) Filed: Oct. 3, 2011

(65) Prior Publication Data

US 2012/0021389 A1    Jan. 26, 2012

Related U.S. Application Data

(63) Continuation-in-part of application No. 12/642,865, filed on Dec. 21, 2009, now abandoned, which is a continuation-in-part of application No. 12/163,447, filed on Jun. 27, 2008, now abandoned, which is a continuation-in-part of application No. 12/016,995, filed on Jan. 18, 2008, now abandoned, which is a continuation of application No. 11/021,853, filed on Dec. 23, 2004, now abandoned.

(51) Int. Cl.
*G09B 5/04* (2006.01)
*G09B 5/06* (2006.01)
*G09B 19/04* (2006.01)

(52) U.S. Cl.
CPC ............... *G09B 5/04* (2013.01); *G09B 5/06* (2013.01); *G09B 19/04* (2013.01)

(58) Field of Classification Search
USPC .................... 434/156, 308, 318, 320, 185
See application file for complete search history.

(56) References Cited

U.S. PATENT DOCUMENTS

| | | | |
|---|---|---|---|
| 6,500,006 B2 * | 12/2002 | Wakamoto | 434/156 |
| 6,705,869 B2 * | 3/2004 | Schwartz | 434/219 |
| 6,928,329 B1 * | 8/2005 | Giaimo et al. | 700/94 |
| 2002/0115044 A1 * | 8/2002 | Shpiro | G09B 5/06 434/156 |

* cited by examiner

*Primary Examiner* — Kesha Frisby
(74) *Attorney, Agent, or Firm* — Michael D. Eisenberg

(57) ABSTRACT

This invention is an apparatus and a method for language training and general entertainment and role-playing. It employs a digital processing system plays back audio or audio-visual program material, using special software to selectively direct the audio of this playback through the system's speakers or a headset, with the user taking the headset audio—in particular speech—as a model and prompt to repeat this speech. The user plays the role of the speaker in the program material, and the software further permits the user to record, in audio or audio-video, her dubbing efforts along with the program material, producing a version of the program material with the user's voice recorded in place of, or in conjunction with, the voice of a character in the program material. The user's recorded performance can also be overlaid onto the original program material.

19 Claims, 13 Drawing Sheets

INTERACTIVE IMMERSION SYSTEM FOR MOVIES, TELEVISION, ANIMATION, MUSIC VIDEOS, LANGUAGE TRAINING, ENTERTAINMENT, VIDEO GAMES AND SOCIAL NETWORKING

CROSS-REFERENCE TO RELATED APPLICATION

This application is a Continuation-in-Part of co-pending application Ser. Nos. 12/642,865 and 12/163,447, the latter being a Continuation-in-Part of application Ser. No. 12/016,995, which was a Continuation of application Ser. No. 11/021,853 by the same inventor, and the disclosures of all are hereby incorporated by reference.

BRIEF SUMMARY OF THE INVENTION

This invention is a system and a method for interactive immersive language training and general entertainment and role-playing. It can provide an enhanced, instructive and entertaining online TV interactive immersive user experience for people from all walks of life, and to the multi-millions of deaf and hard-of-hearing (DHH) and foreign language, heritage language and English-as-a-second-language (ESL) learners worldwide. It involves using a computer to access a website incorporating a unique player that can play back audio or audio-visual program material, using special software to selectively direct the audio of this playback to a normal, generally-audible sound system or a second sound system that is particularly audible only to a user, such as a headset, with the user taking the audio routed to her headset—in particular speech—as a model and prompt to repeat this speech audibly. Ideally, the user finds herself playing or dubbing the role of the person in the program material whose speech is being routed to the user's headset, and the special software further permits the user to record her dubbing efforts along with the program material, producing a version of the program material with the user's voice recorded in place of, or in conjunction with, the voice of a character in the program material. There has been a recent proliferation of "kids' pages" on the web sites of government and business organizations—the sites of the CIA and FBI are two examples—and this invention, both in its basic embodiment and with game-playing variations mentioned below, is attractively applicable to such sites, such as via a "Speak &Be®" or "Role Play" button that can be incorporated into any website, which gives the user access to Interactive Media Player and Role Playing Game features.

DETAILED DESCRIPTION OF THE INVENTION

Figure 1:
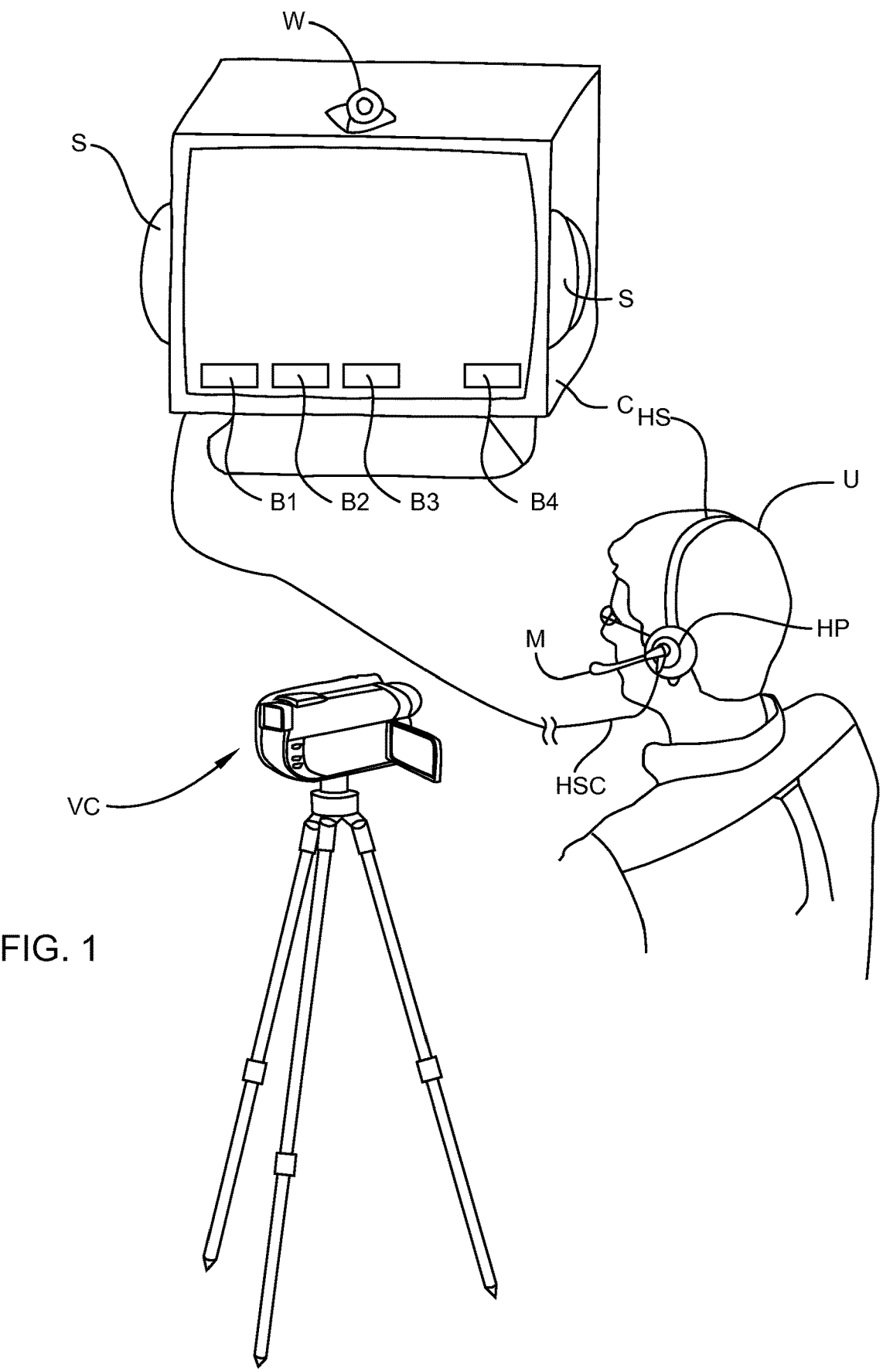
FIG. 1 shows a user (U) practicing the invention, wearing a headset (HS) with a headphone (HP) on one ear, a microphone (M) to pick up his utterances, a headset cord (HSC) connecting the headset to the computer (C), which is displaying program material on its screen and playing its audio through speakers (S). Various mouse-clickable software control buttons (B1-4) are shown, along with a screen-mounted camera or webcam (W) and over-the-shoulder-shooting video camera (VC).
Figure 2:
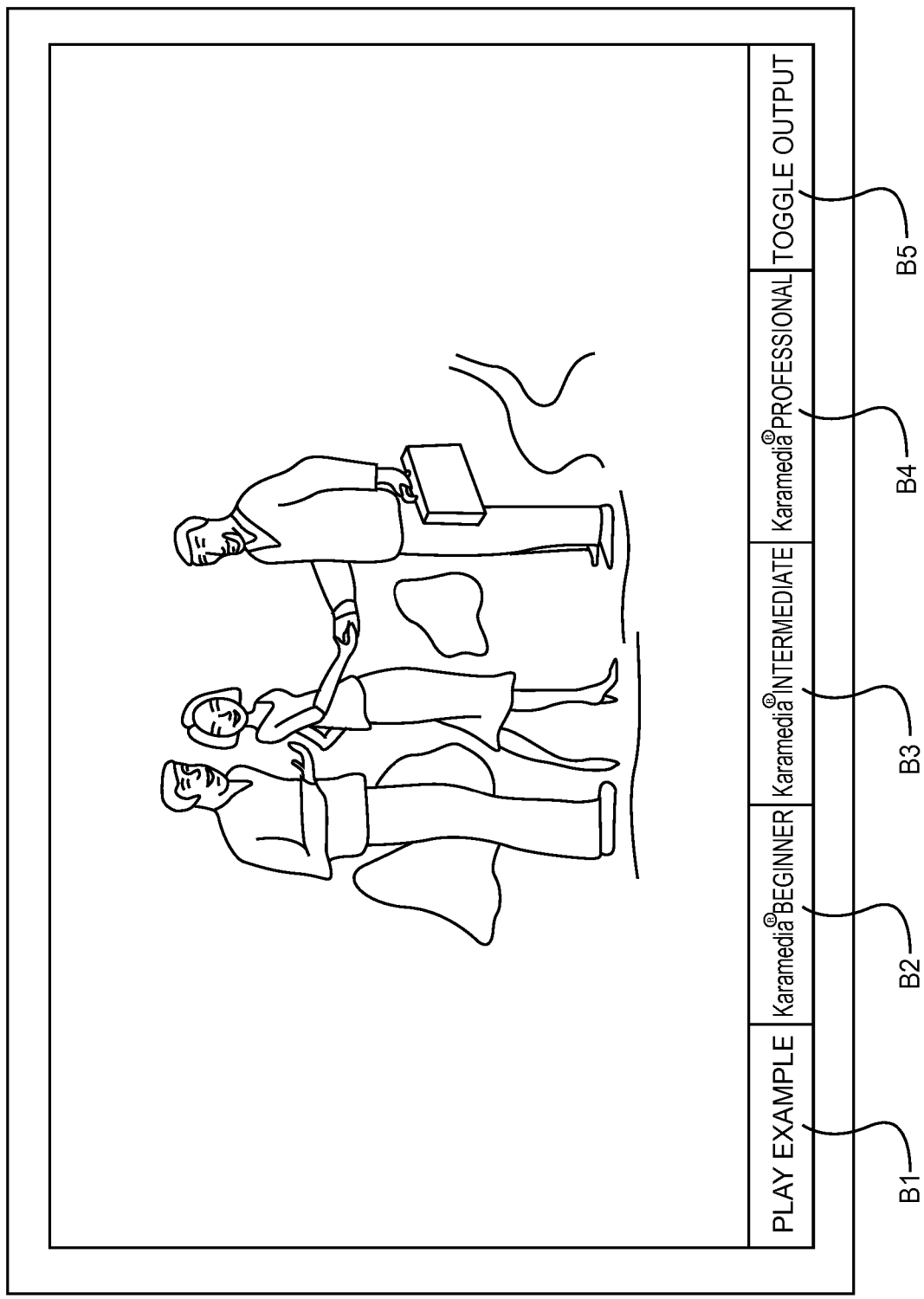
FIG. 2 shows a computer screen displaying program material, with four mouse-clickable software control buttons—B1, B2, B3, B4 and B5—shown at the bottom of the screen.
Figure 3:
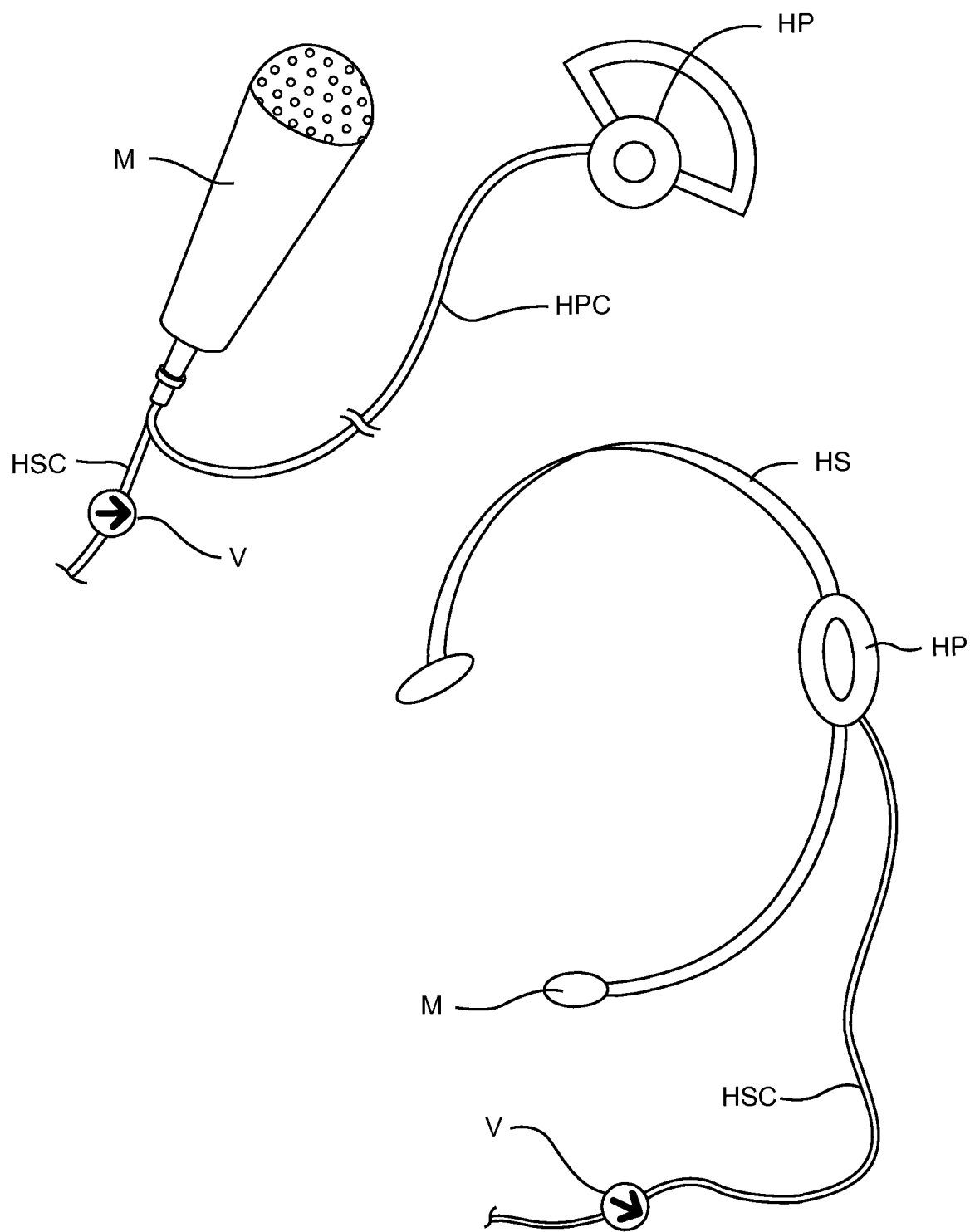
FIG. 3 shows a headset (HS) with a headphone (HP) for one ear, a microphone (M) and a headset cord (HSC), to connect the headset to the computer, that includes a volume control (VC) to adjust headphone volume, as well as an alternative microphone (M) and headphone (HP) combination, either connected by headphone cord (HPC) and headset cord (HSC) or wireless sly.

This invention, like the inventor's co-pending invention of which this is a C.I.P., addresses the problem of how to make language teaching and training more entertaining and attractive as a process, and does so in a way that is sufficiently entertaining so as to be worthwhile even without a language-learning component. This is a development of the inventor's prior invention, enhanced with the application of special software to make the invention particularly easily distributable and practicable. As envisioned, this invention could be easily used in conjunction with any program material available in digital form, on the internet or elsewhere, in particular and most innovatively with program material resident on the user's own computer.

This invention involves a further embodiment of the inventor's Karamedia® process function of routing particular audio to the user's headset and other audio to generally-audible speakers. It comprises using a computer and/or an audio-video player on a website to play program material, such as audio dialog or a song, or an interview or a movie or TV or video of whatever source, in a language the user wants to learn—in the educational application—or that contains a character or role the user would like to play—in the entertainment application. Special software, the code for an example of which appears below, is used to direct the audio either to the computer's regular speaker system or another generally-audible speaker system on the one hand, to a headset or some other second speaker system that is particularly audible only to the user on the other hand, or optionally to both—in addition to directing the output destination of the audio, the special software can also control the sonic characteristics of the audio, i.e., volume, tone, and even special effects such as reverberation. The user controls this selection of the audio output through a variety of means, for example through on-screen clickable buttons, or hotkeys on a keyboard, permitting toggling back and forth between speakers and headset—this can also be accomplished through the use of a more traditional switching device, optimally a hand-held toggling controller, for example using A/B switches or a toggle switch; this hand-held switch could optionally employ wireless technology. The user chooses a character in the source material that she desires to "play", and when that character speaks in the source material, then she directs his speech to play into her headset, thereby prompting her to repeat it audibly as it plays in her ear. When his dialog ends, she switches the audio back to the computer's regular sound system, hearing the other dialog in the source material from a greater distance, just as in a normal conversation—to this end, the headset ideally is a mono unit with a speaker for only one ear, or else a stereo unit with one speaker worn off the ear. It can readily be seen that, while hardware constraints and wiring conventions may make it difficult to simultaneously utilize a laptop computer's internal speakers while having a headset connected to the computer's mini phone plug output, such difficulties can be obviated by utilizing a different sort of connection such as USB. A further helpful variation would be to utilize separate external speakers—optionally powered, for example via mains power, batteries or USB—connected via USB connection, further incorporating a USB jack for connecting a headset.

In addition, the headset can have a microphone, and the software can permit the recording of the user's dialog, optionally in conjunction with the program material, to give the user a reviewable record of her efforts. In the case of audio-visual material, this can be done either with the user's dialog overdubbed into the original video, or with the user's performance recorded audio-visually and displayed together with the original program material in split screen, picture-in-picture, or some other juxtaposition such as having the user's performance captured from over her shoulder, showing both her, performing somewhat in profile, and the screen with the program material. A further wrinkle in this process can be the capability of the special software to control and vary the speed of playback of whatever media program is used to play back the program material.

This process of dubbing the dialog of a character in the voice of the user proves to be both highly instructive and entertaining—so entertaining, in fact, that is an enjoyable pursuit even absent the original instructive intent. It can be turned into a game or video game through a variation by which one directs the audio selectively to the headsets of multiple users, with the various users audibly playing out the dialog of the characters onscreen. Recording the results along with the video of the program material allows the users to see how well—or poorly—each did in delivering the performances of the characters for whom they were dubbing dialog. In addition, adding the visual recording of the user's efforts permits the keeping of a record to track progress, and allows users to share their performances with others on file-sharing and social websites, such as Facebook®, and video communication services such as Skype®.

This invention is envisioned to be practiced with a regular personal computer, although it can be practiced on any device capable of accepting user inputs and displaying and playing program material, such as laptop computers, tablet computers such as the iPad®, smart phones such as the iPhone®, and other mobile and static devices of various kinds. The user can employ program material present on a specific website ("the target site"), use program material already resident on her own computer, or she could use other program material on another website such as YouTube®—including accessing and utilizing playlists on such sites—or link it to the target site. The interactive video player and special software could be present either on the target site or the user's computer, and could optionally be distributed via Smilebox® and similar avenues for sharing content. The interactive video player presents clickable buttons onscreen which permit the directing of audio output to one of a plurality of outputs, one of which would connect to the computer's sound system, and another to a headset. The headset would also have the microphone typical of common computer headsets, and the user would hear the selected dialog through the headset and speak it back into the microphone. The interactive video player would permit the recording of this repeated speech, and the user would review it to check her accuracy.

The interactive video player has, incorporated into it, programming that manipulates parameters in the audio/video player utilized (e.g., Flash®, QuickTime®, Windows Media®, etc.) so as to alter the Audio Balance default setting to direct the audio from the selected program material to be directed to the a specific channel. It can easily be understood that, with the increasing profusion of multi-channel audio formats—stereo, stereo plus center channel, 5.1, 6.1, 7.1, etc. —there can be a number of channels toward which to direct the audio signal; for the sake of simplicity and comprehension, and without suggesting any limitation, this description will have the audio directed to the left channel.

Figure 4:
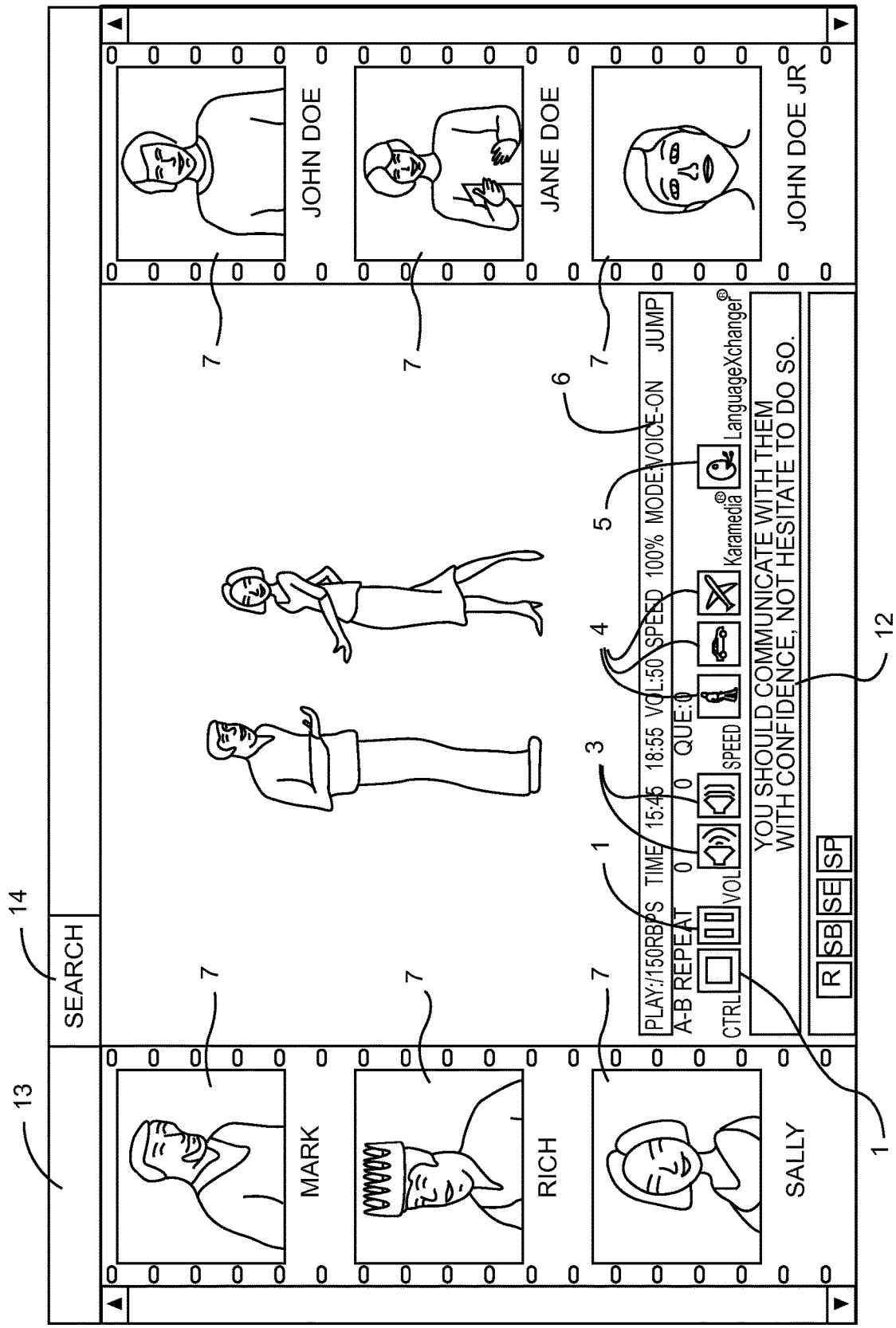
FIG. 4 shows the interactive video player playing audio-visual program material (6), with control buttons below: Stop (1), Play/Pause (2), Volume (3), Playback Speed (4)—walking, driving and flying indicating slow, medium and fast—and Toggle Control for the Karamedia® effect (5). One can selectively view a running transcript of the dialog (12). A search box (13) and button (14) allow searching the text of the transcripts of the program material for key words or phrases. Buttons along the sides (7) allow accessing other program material, and additional buttons allow recording the user's performance (R), marking the beginning of a particular segment (SB) of the program material, marking the end of the segment (SE), and playing back the thus-marked segment (SP).
Figure 5:
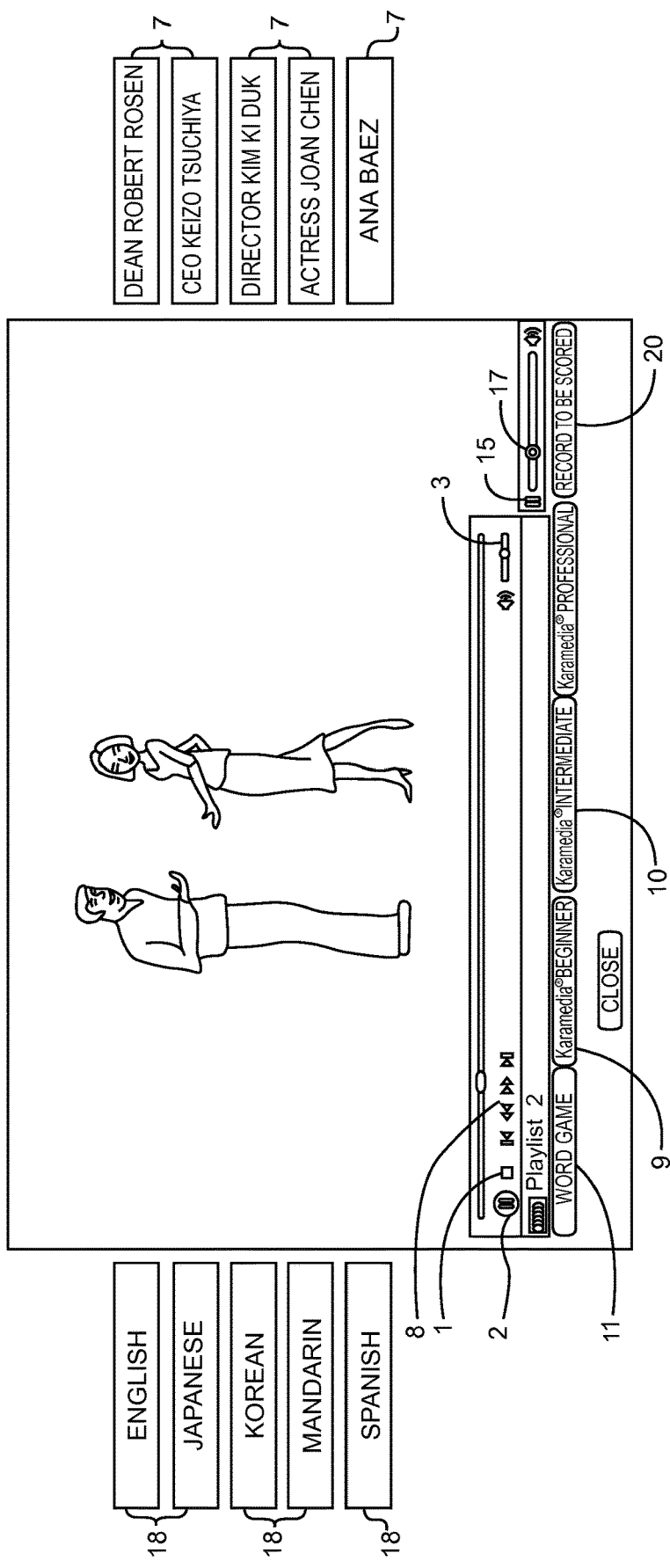
FIG. 5 shows another version of the interactive video player, with Play/Pause (2), Stop (1) and Scan and Skip Controls (8), plus Karamedia® slow-speed (9)—Beginner—and regular-speed (10)—Intermediate—controls (not shown is an optional, additional "Karamedia® Professional" button) and a link to a word game (11) incorporating vocabulary words from the program material, plus buttons along the sides (7) accessing other program material. A search box (13) and button (14) allow searching the text of the transcripts of the program material for key words or phrases. A button (15) starts and stops background music, and a fader (17) increases or decreases its volume. Another fader (3) increases or decreases the volume of the program material, and a button (20) allows recording of the user's performance. Further buttons (18) permit the selection of various languages for translation or transcription.
Figure 6:
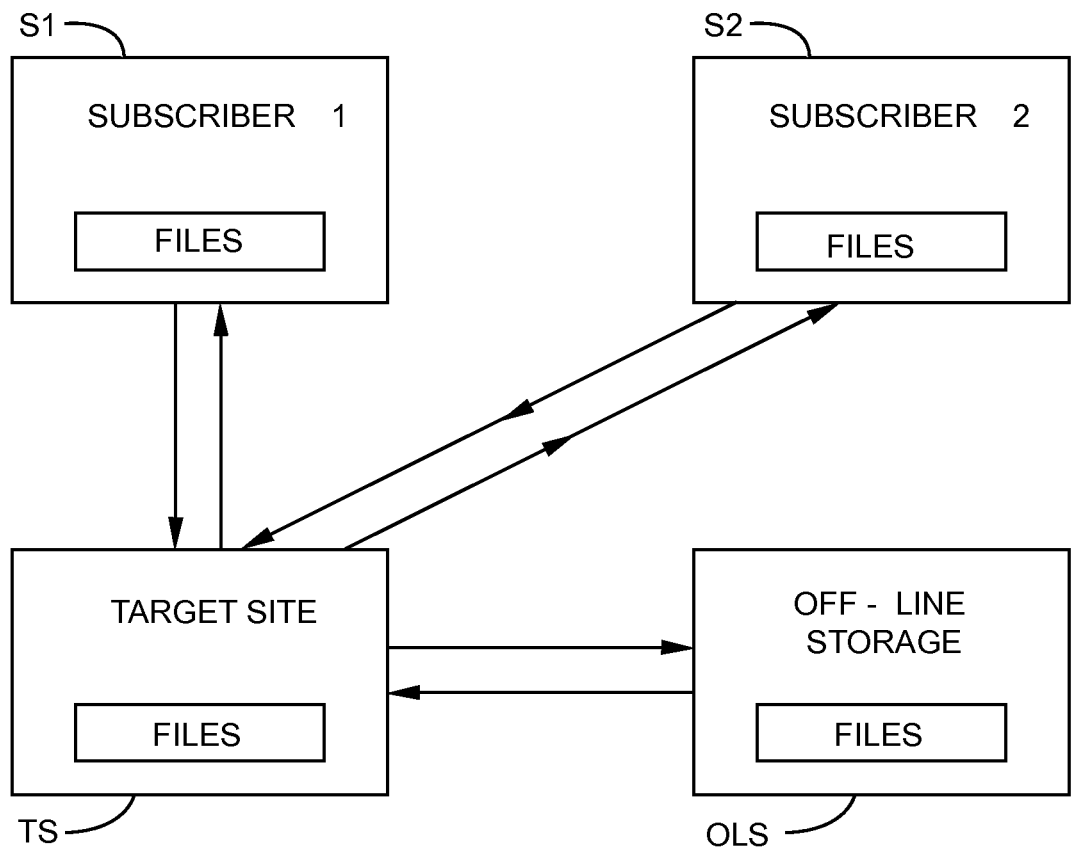
FIG. 6 shows a program material file-exchange scheme, showing Subscriber 1 (51), Subscriber 2 (S2), the Target Site (TS) and Off-Line Storage (OLS), and how files can be accessed by one from another.
Figure 7:
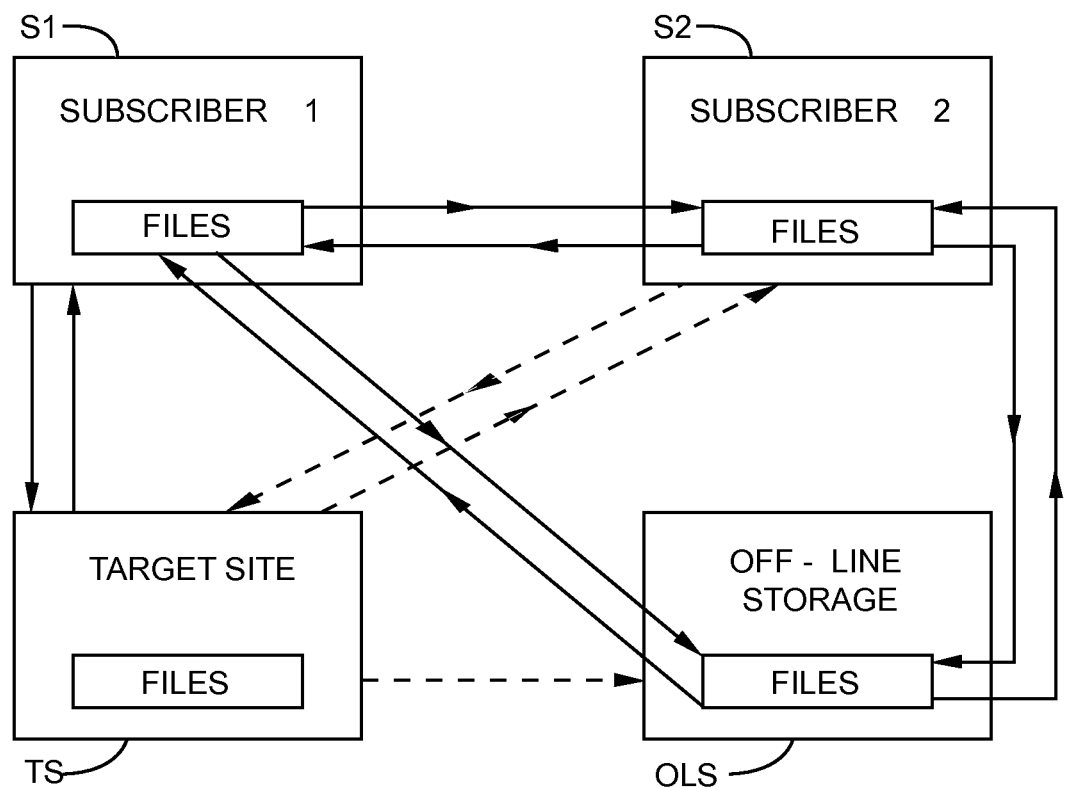
FIG. 7 shows an alternative website size-minimizing file-exchange scheme, showing Subscriber 1 (S1), Subscriber 2 (S2), the Target Site (TS) and Off-Line Storage (OLS), and how large video files can be accessed by one from another with the solid lines, while small password and instruction files and customized media players are shown passing via dashed lines.
Figure 8:
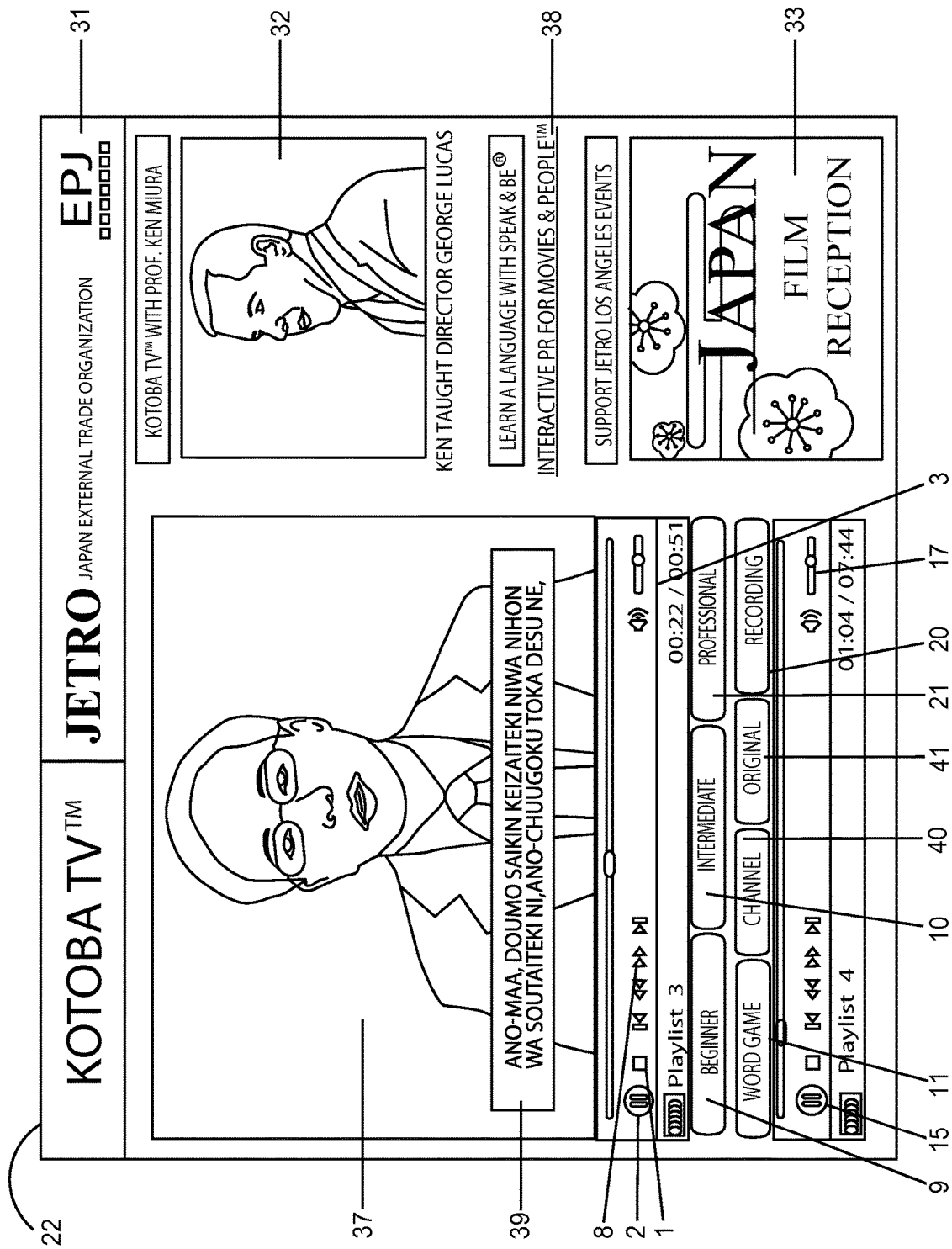
FIG. 8 shows a web page (22) with another version of the interactive video player, with Play/Pause (2), Stop (1) and Scan and Skip Controls (8), plus Karamedia® slow-speed (9)—Beginner—and regular-speed (10)—Intermediate—controls to play back a clip (37) with subtitles, plus another speed control (21) for Professional mode, which permits playback at normal speed, but without the Karamedia® effect. There is also a link to a word game (11) incorporating vocabulary words from the program material forming a word list (23), and a button (15) starts and stops background music, while a fader (17) increases or decreases its volume. Another fader (3) increases or decreases the volume of the program material, and a button (20) allows recording of the user's performance. There are ad images 31, 32 and 33), and any of these can be provided with links to ad sites. There is also a link (38) to a page showing demonstrations of user-created video of users practicing the invention, and another link (40) to profiles of users, plus switchable captioning (39), and a button (41) that causes the program material to be played unaltered.
Figure 9:
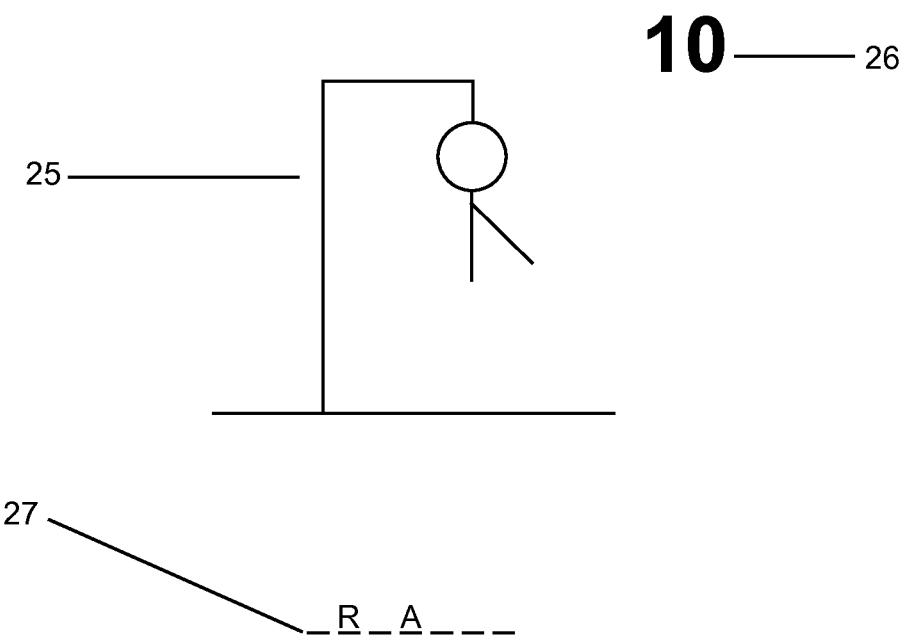
FIG. 9 shows the hangman game, with gallows (25) holding three "body parts" representing three wrong guesses (they appear as if hand-drawn), timer showing seconds left (26), blank spaces for the letters to be guessed (27), showing two correctly-guessed letters, derived from a word list generated from a dialog transcript, a hint about the word to be guessed (28), and a matrix of letters of the alphabet to be selected from (29), including letters already guessed shown crossed out—the English alphabet is shown, but the letters available would vary depending upon the language selected—and a button (30) to permit the user to start a new game.

The interactive video player also has, incorporated into it, programming that manipulates parameters in the audio/video player utilized to alter the Speed or Rate parameter so as to permit the selection of reduced speed (what, in conjunction with video, would be called slow-motion). If the dialog is too difficult for the user to repeat at the original speed, she could avail herself of the speed-control capability of the interactive video player and play the program material back at a slower speed (utilizing the Karamedia® Beginner button 9), thereby allowing her to literally get up to speed. Once up to speed, the user could revert to normal speed (the "Karamedia® Intermediate button 10) and, if she became truly proficient and wanted more of a challenge, the player could additionally be equipped with a "Karamedia® Professional" button 21, which would entirely mute the audio of the dialog to be recited, optionally instead supplying subtitles of that dialog. These subtitles 39 can be as seen in FIG. 8, or in a caption box 12 as shown in FIG. 4, or even supertitles. These three assistive features—subtitles/supertitles/closed captioning, playing the program at slower speed, and prompting the user with audio—can optionally be turned on and off individually, or can be combined into the sort of presets described as the Karamedia® Beginner, Intermediate and Professional buttons. The easiest or most assistive variation would be slower-speed playback with captioning and prompting, and these features can be selectively deleted to make the use more challenging, until the user graduates to standard speed without captioning or prompting, potentially an ultra-professional button.

A player page could contain a Channel button 40, optionally termed a Profile button, that would link to profiles of users. These profiles can be a video profile page or a Facebook® profile page of the users executing role play performances. Another link 38 could be to a social network application page, where users could make role-play videos of themselves employing the Karamedia® and post them. This could incorporate a Facebook® application allowing users to comment on and "grade" the posted role-play videos of others, which would cause a link to appear on Facebook® on the users' pages. Additionally, a player page could contain an Original button 41, which would play back the program material in original, unaltered form.

Figure 12:
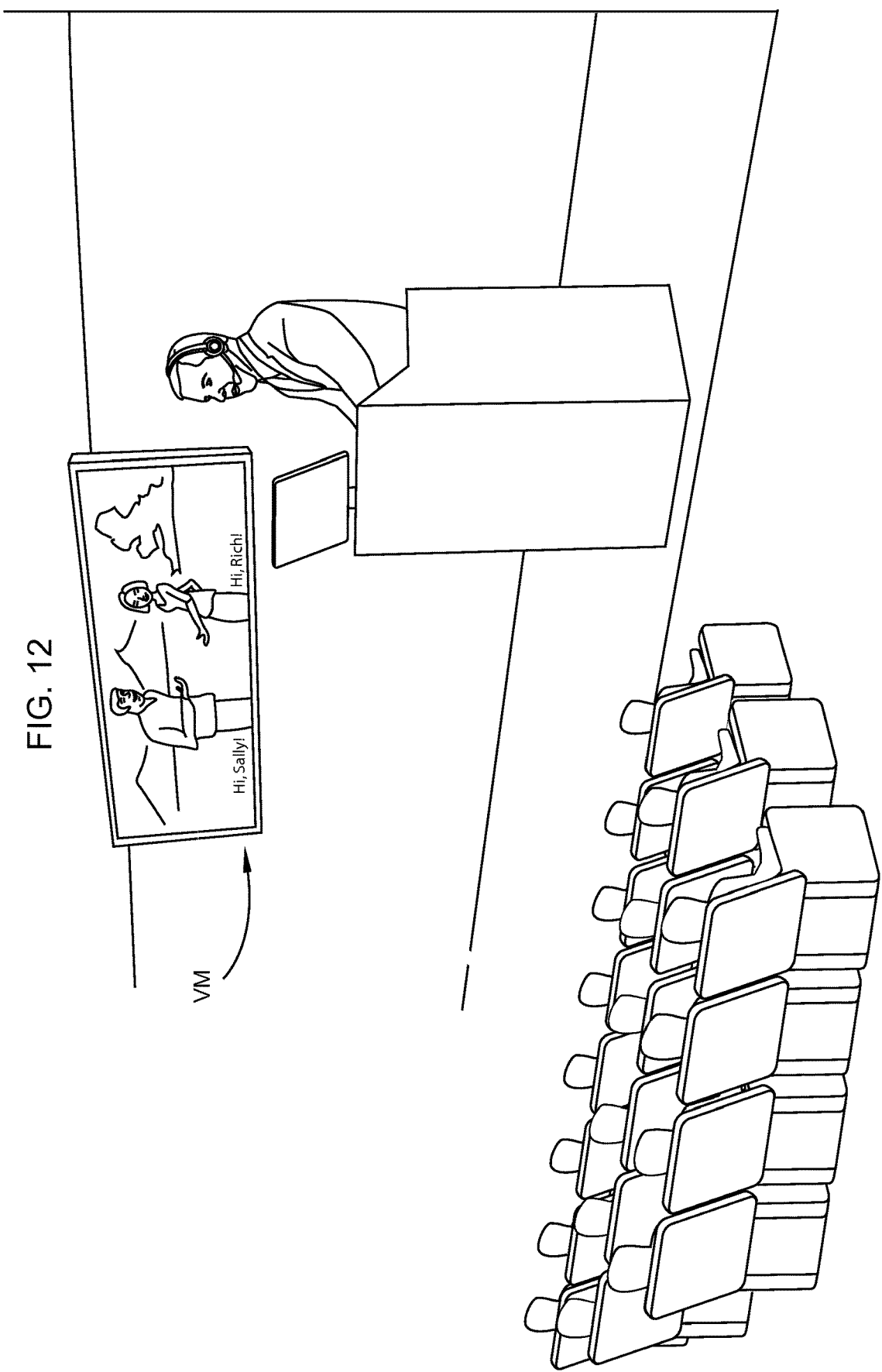
FIG. 12 shows the invention being practiced in a game show setting, with program material displayed on a video monitor (VM).

Furthermore, the interactive video player can incorporate a "comparison" or "rating" function, which would compare the user's performance to the original dialog and assign a rating or grade or score, reflecting the accuracy of the user's performance. This could be done "manually", by providing the service of having a person actually compare and evaluate the user's performance. A preferred alternative, however, would be to accomplish this near-instantaneously through the use of voice-recognition software, which could directly compare the two audio files and produce a grade or score for the student's performance. Alternatively, the voice-recognition software could be adapted to provide transcripts of both the original dialog and the user's performance. These documents would then be compared, in a manner similar to the "tracking" or "red-lining" functions of word-processing software, with the differences between the documents being totaled and generating a grade or score. The student's grade or score could be the number of "errors" or deviations, or that number weighted against the number of words in the entire dialog, or some other method could be employed. In a preferred embodiment, one could use that weighted number to generate an expression of the percentage of the performance that was correct, encouraging the user to strive for a score of 100. This can be turned into a formal game or competition, in a social gathering, classroom or even game show setting, as in FIG. 12.

In a further variation, the interactive video player would contain a link to a page displaying such a transcript of the original dialog, as an aid for matching aural recognition of a language with reading. Such a page could also contain a translation of the transcript, and even selectably in a plurality of languages. Such a page could further contain a vocabulary list to aid a user utilizing the invention for language study. The interactive video player could further contain a link to a game page specially adapted to each program material clip, and employing just such a vocabulary list as fodder for a "hangman" or crossword or other word game. A preferred embodiment features an on-line "hangman" game that randomly selects a vocabulary word and delivers a hint or clue. Play proceeds as in the normal pen-and-paper version of the game, although a preferred variation incorporates a count-down timer for each "guess" or "turn", giving the user a limited period of time, e.g., ten seconds, in which to select another letter or forfeit the turn and suffer the addition of another limb on the hanged man. Furthermore, the number of wrong guesses (and forfeits) can be combined with the amount of time used to generate a score for the user. To aid in selecting words or subject matter for the playing of such games, the interactive video player can incorporate a "search" function that can search the transcripts for a specific word or words. Such transcripts, word lists and translations can be grouped together and optionally accessed via a pop-up menu. It can easily be seen how such a game can make learning fun and spark greater exposure to and interest in foreign languages.

Such a transcript—which can be auto-generated through voice-recognition software—can also be used to generate captions or karaoke-style subtitles, which can be scrolled by the user to keep them in sync with the dialog in the program material, but which can also be synced to the program material in any number of other ways, including but not limited to being embedded in the program material, as an overlay, being synced to a time code in the program material, through voice-recognition software, or just timed to coincide with the dialog when program material and captioning/karaoke-style subtitles are started at the same time, which starting can itself be synced. As a further variation, the words in the captioning/karaoke-style subtitles can be highlighted in sync with the unfolding dialog, synced, for example, in any of the ways listed above. Captioning/karaoke-style subtitles and highlighting would be user-controllable.

In addition to being prompted by the dialog she is to speak by hearing it in her headset and seeing the captioning/karaoke-style subtitles, the user can be prompted by a cue that "her" character is about to speak, so that she is ready to speak the character's dialog. This cue is preferably a vibration, delivered through the headset or a wired or wireless device fitted elsewhere on or near the user's body, but it can also be a light or sound or anything else that would alert the user. This cue can, for example, be triggered by a signal embedded in the program material, or by a time code in the program material, or by a particular word or passage in the captioning/karaoke-style subtitles, or through simple timing from the beginning of the program material, or by voice-recognition software.

A further variation is to provide a second version of the program material, stripped of one or more of the voices present in the original. A vivid example of this is when the program material is a song, so that the second version is just the music; with a scene from a movie, by way of contrast, the second version would be the background music and sound effects, referred to as M&E in movie sound. The user could switch between the two versions, changing from being cued by "her" character's voice to having no original performance to copy, and the second version can also be overlaid on the original. This second version could also be combined with the user's performance and, if and when the performance and this second version are combined and recorded, the recorded combination will provide a more complete impersonation of the original program material. This combined impersonation can be compared with the original program material, and software can evaluate the comparison and generate a grade for the user's performance. Other users/friends/interested parties can also weigh in on the performances, in person and via any number of other means such as social networking web sites such as Facebook®, YouTube®, and Salesforce's Chatter®, and other web sites and communications means, and can give grades and other evaluations of the user's performance, and they can also overlay their own performances on the original user's—or, of course, on the original program material, just as the original user did. Toggling between versions, combining a version with the user's performance, and recording and playing back performances are all user-selectable.

As previously mentioned, the program material can be any audio-visual program material, including movies, TV shows, music videos, and clips shown on YouTube® and other web sites.

It is critical to note that captioning and overlaying and any of the other treatment of existing program material can be carried out without disturbing the existing program material, e.g., the stream of web-based program material is kept intact.

While most ordinary home computers lack the specific left and right channel outputs discussed earlier, a relatively simple implementation involves using a splitter adapter inserted into the regular speaker output present on all modern personal computers. The splitter adapter would split the signal into left and right channel outputs, and the feeds to the speakers and headset could each be connected to one channel, for the sake of easy reference say headset to left, and speakers to right. With the mini-phone jacks and plugs normally employed with personal computers, inserting a stereo speaker plug into a mono splitter jack will normally result in only the left speaker in a typical stereo pair getting a signal, but this can be corrected by having a stereo-to-mono adapter inserted between the speaker plug and the right channel of the splitter adapter. Similarly, if a stereo headset is plugged in in such a manner only its left unit will get a signal which, given the fact that one only listens to one headphone speaker in practicing this invention, actually works out perfectly. When the program material is playing dialog that the user does not wish to recite, the software is set to route the audio to the right channel, and thus to the speakers; when the dialog that the user wants to "play" commences, the user clicks the appropriate control (or presses the appropriate "hot-key") to route the audio to the left channel, and thus to the headset. The headset's microphone is be connected to its normal input on the computer.

In a particularly useful embodiment, in computers with separate speaker and headphone jacks, the software would route the program material's audio selectably to the speaker or headphone jacks, and would convert, as needed, mono audio signals to be directed to both speaker channels and stereo audio signals to mono for the headset. In laptop computers, which typically contain internal speakers, the software would perform the same function in routing signals selectably to the internal speakers or the headphone jack. It must be mentioned that there are computers wherein the routing of audio signals to internal speakers vs. to headphone jacks is hardware-controlled, e.g., where the insertion of a headphone plug into the headphone jack physically interrupts the connection to internal speakers or speaker outputs, and such computers would need to be modified in order for this function to be software-controllable. A key point is that this invention can take audio from a single source or channel and achieve the Karamedia® function of routing particular audio to the user's headset and other audio to speakers without needing to "treat" or edit or re-record the audio first.

A further enhancement of this invention is to provide, optimally on the target site, a selection of background music and sound effects that can be selected to be combined with the program material. With program material consisting of an interview or other monolog (or which is simply unusually "dry"), it is an enhancement to the experience of practicing this invention to add some sort of selectable background music or other effect, which is routed to one or more of the speakers. Having background music or effects playing continuously through the speakers while the program materials's dialog is toggled back and forth between the speakers and the headset is very effective in creating the sense that the user is stepping into the scene she is playing.

Additionally, the player, through the use of time-code recognition or other means, allows the user to "tag" both a start and an end point in a piece of program material, so that just a desired segment of a given program may be played and, optionally, repeated or looped. The player and software can also incorporate the ability to vary the strength of the signals going to the speakers and headset and coming from the microphone, so as to permit the balancing of those levels.

The audio-video player control capability bundled into this invention makes possible its use as a customized "skin", with its controls manipulating a known player, such as Windows Media Player®, Flash Player® or Apple QuickTime®, as well as controls to permit using the invention to control the speed of playback, playing word games, and furnishing transcripts. Sites incorporating this invention can incorporate links to advertising or even ads that can play in windows right on the actual site, optionally even being manipulated by player features, such as the adding in and modulation of background music.

The video clips used—both the program material and also videos of the users "performing" it—can, with the aid of this invention, become staples of language exchange forums/communities.

In an especially effective and efficient embodiment, this invention would be practiced on the internet. A web site (the "target site") could contain an array of program material and a video player incorporating the invention, and users could access the site, download such a player and play program material streamed to their computers.

In a further development, to minimize size and capacity needed for the web site, the program material could be resident in other, off-line locations, such as an off-line storage server operated by the web site, or on the users' own computers. In this latter variant, the user would give the web site identifying information for the user's computer and the file path of the file on the user's computer containing the program material. The web site would incorporate this information into a customized video player that would be downloaded to the user's computer and would play that specific program material file. Users could make files on their own computers accessible to other users, and video players could be similarly be customized to permit one user to download and play the program material resident on another user's computer; program material on other computers could be accessed similarly. In this way, the web site itself would only be a conduit for the small video player files, rather than the large audio-visual program material files, which would move directly from one computer to another, thus permitting a streamlined web site with just thumbnail listings of the available program material and links, rather than the entire program material files.

DESCRIPTION OF THE PREFERRED EMBODIMENT

The ability of this invention to employ program material from a remote location is especially helpful in the preferred embodiment. The interactive video player is incorporated into a website, the "target site" as mentioned earlier, on a web page. The user would register with the target site to become a member or subscriber, and would then submit the file path of program material, residing in her own computer, to the target site (alternatively, she can submit the URL of program material on the internet, or the program material can be incorporated on the target site in the more traditional manner). The target site accesses this program material and enables the interactive video player to play it back on the user's computer (having the program material reside off-site very advantageously diminishes the server-capacity requirements of the target site). Subscribers would be encouraged to record their performances, as described in greater detail below, and either post them on the target site or post the file path of the recorded performance identifying where the recording resides on the subscriber's computer—they would be similarly encouraged to share their own program material for sharing with other subscribers. As a community of subscribers arises, there would be an increasing multitude of program material choices available to subscribers.

In order to keep the web server requirements to a minimum, the number of program material and performance clips kept on the web site could be kept to a minimum, e.g., a "Top 10" of each, with all the rest being accessible from an off-line storage site.

The interactive video player permits the user to select a portion (or all) of the program material to play, the speed at which to play the program material, and background music or other effect. The user clicks on the controls of the interactive video player to select when to direct the program material audio to her headset, when to her computer's speakers, and to toggle between the two. Prompted by the audio routed to her headset, the user repeats it, attempting to synchronize her voice with the prompt (and thereby with the video component of the program material). The user's vocalizing is picked up by the headset's microphone and the recorded by the interactive video player, as is the user herself with the use of a video camera. When the user is done with reciting/recording, she can hear and see her performance played back, to judge how well she carried out her task. Using a screen-mounted video camera pointed at the user, such as are frequently found on laptop computers, the player and software would play the user's performance back in a split-screen or picture-in-picture format, with the user's performance next to the original program video, or allow the user to switch back and forth between her own performance and the original; a camera mounted off near one of the user's shoulders could advantageously capture both the user's performance and the program material on-screen, and wouldn't require a split screen. The finished, "combined" recording, which can frequently be poignant, impressive, funny or all three, can be saved, and shared with others on sites like YouTube®, Facebook® or other social networks, or used in blogs.

Figure 13:
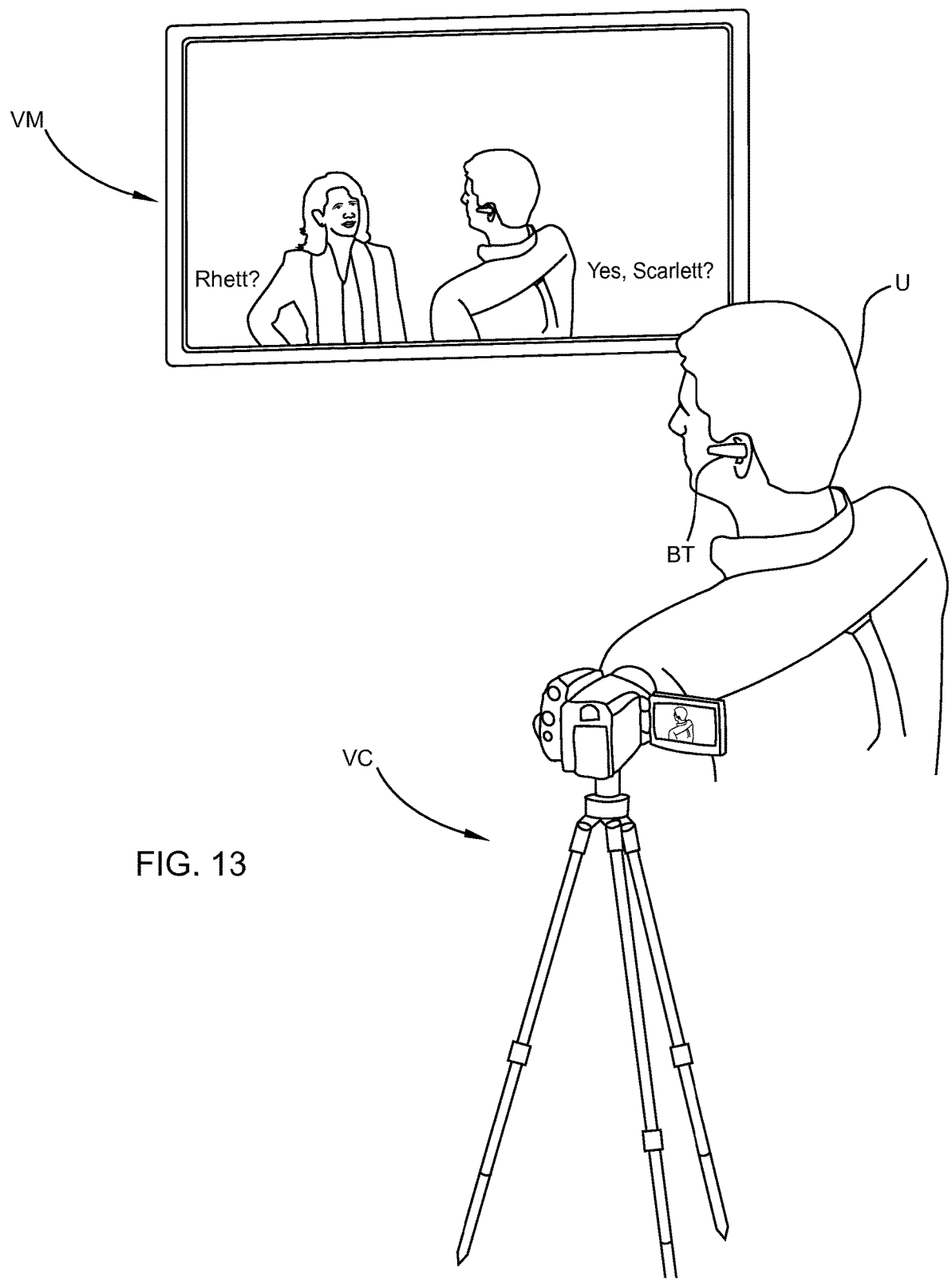
FIG. 13 shows the invention being practiced with a Bluetooth® earpiece (BT), while the user (U) records himself with a video camera (VC) and superimposes his image into the program material, displayed on a video monitor (VM).

In a further variation involving a screen-mounted camera, the user can employ a Chroma Key or similar process, which involves having a "cancelable" background behind her—this is normally a solid-colored background, often green or blue, referred to in the motion-picture industry as "green screen" or "blue screen". Assuming the use of a green screen, that color can be "canceled" from the picture, leaving only what is not green—the user can wear green clothing to cover parts of her body, as well, and could, for example, leave only her head visible. Thus, the user could video-record her performance, and then superimpose her own image onto the program material. Most advantageously, the user could superimpose her image over the image of the character whose dialog she was performing, even in real time, i.e., as she was delivering the performance. With a joy-stick or other controls, the user could place her image and orient her head and/or body so as to copy the movements of the character and try to "replace" that character on screen as perfectly as possible. It can readily be seen that this could turn into an amusing pastime, and users could record their superimposed performances to enjoy and share with others. FIG. 13 shows such an application, with the user's image inserted into the program material. The user is being prompted with dialog via a Bluetooth® earpiece (BT); it should be noted that the user's own speech need not be recorded via such an earpiece, but can rather be picked up by a microphone in the video camera (VC) or in some other location, allowing the earpiece to be as small and unobtrusive as possible, so as to be essentially invisible on-screen. Also, the location of the video camera is purely for purposes of illustration, as it will generally be more advantageous to have the camera facing the user, perhaps from the top or bottom or side of the video monitor (VM).

One more complex but also even more enjoyable variation of this invention is to have the audio program material made available in such a way that different components of it are accessible separately, so that for example in a scene from "A Hard Day's Night" with the four Beatles conversing, there would be separately-accessible John, Paul, George and Ringo audio tracks. By making the appropriate selection from the special software, the user could elect to play, for example, the role of George and have George's dialog routed to her headphone to prompt her to utter it, while the other three Beatles' dialog would come out of the speakers. Given the vast capacities of digital media, the special software could accommodate a similarly vast number of separate audio tracks, including also separately-accessible and -controllable background and practical music, sound effects, etc.

A similar effect can be achieved even with video scenes that do not have separately-accessible dialog tracks, and indeed even with, for example, older, often public-domain movies where the only available sound track may have music and effects (M&E) and dialog mixed together. Modern digital technology—ProTools® and similar software—can allow one to identify a specific component of a sound recording, such as dialog or even different characters' dialog, strip it out of the recording, paste it into a separate track or tracks, and repair damage done to the remaining recording. At that point, one has the flexibility described in the preceding paragraph.

This practice of replacing the voice of a movie's original actor with the user's own voice, and optionally inserting the user's dialog recitation into a video recording of the movie, can be referred to as "movie karaoke" or "movieoke".

Figure 10:
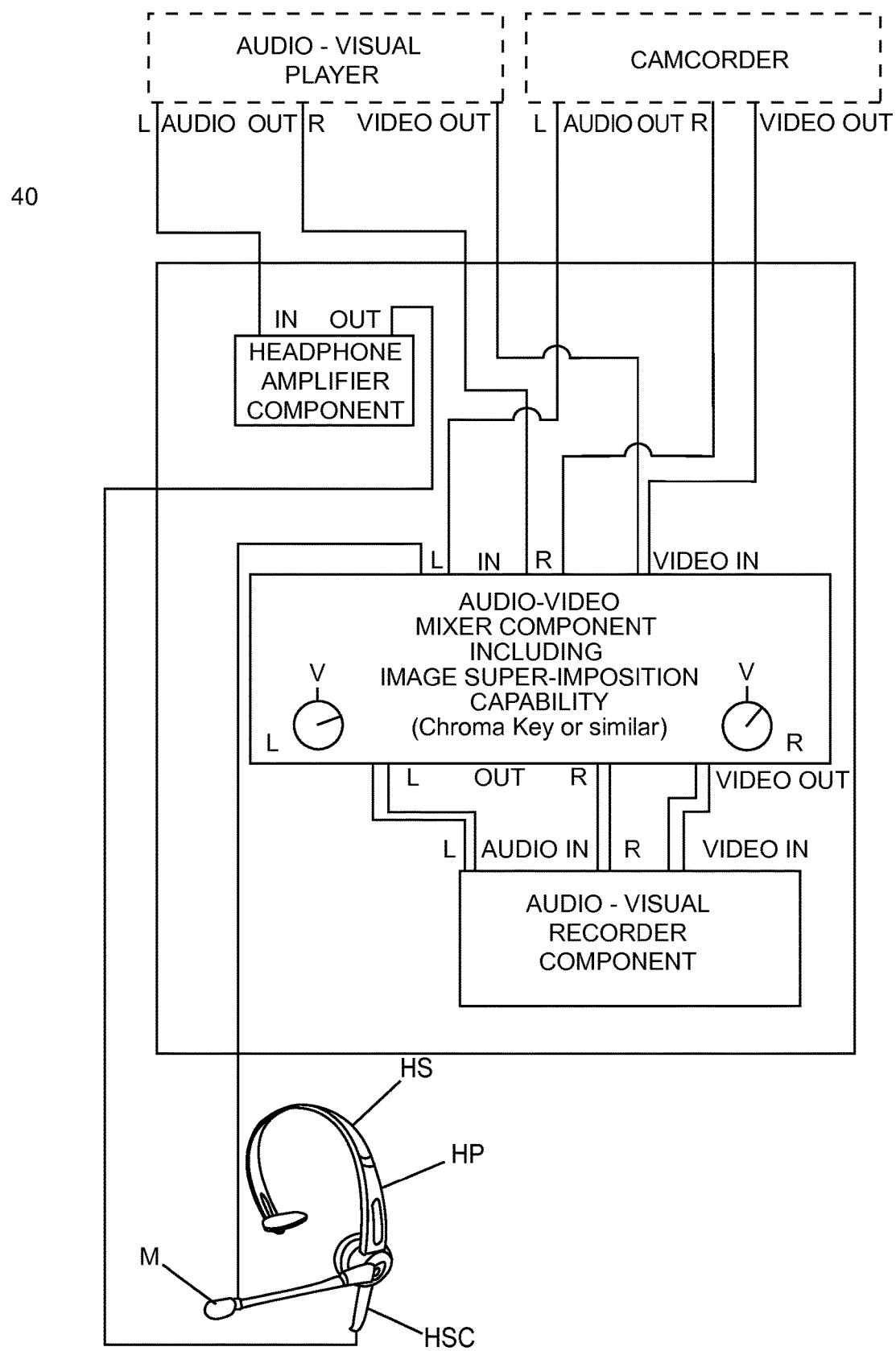
FIG. 10 is a graphic depiction of the hardware components that can be combined into an all-in-one unit (40), incorporating a headphone amplifier, audio mixer and audio-visual recorder into one unit, whose functions alternatively could be rendered by the special software of the invention, with one audio channel going from an audio-visual player through a headphone amplifier to a headphone, another audio channel going from the audio-visual player to one channel of an audio mixer, the output from a microphone going to another channel of the audio mixer, the output from the audio mixer going to an audio-visual recorder, with the video output from the audio-visual player going directly to the audio-visual recorder.

The hardware depicted in FIG. 10—the headphone amplifier, mixer and an audio-visual recorder such as a Blu-ray®, DVD or videocassette recorder—can advantageously be combined into a single unit 40 to which one need only add an audio-visual player such as a Blu-ray®, DVD or videocassette player plus a headset in order to practice this invention. Alternatively, and even more advantageously, these hardware components can be provided in virtual form in software on a computer, which would also supply the audio-visual player, and only a headset would need to be added to practice the invention—as mentioned earlier, a connection that allows the headset to be specifically identified and addressed by the software, such as USB, is ideal. This iteration is particularly well-adapted to the multiple-individual-access variation described in the previous paragraph.

Figure 11:
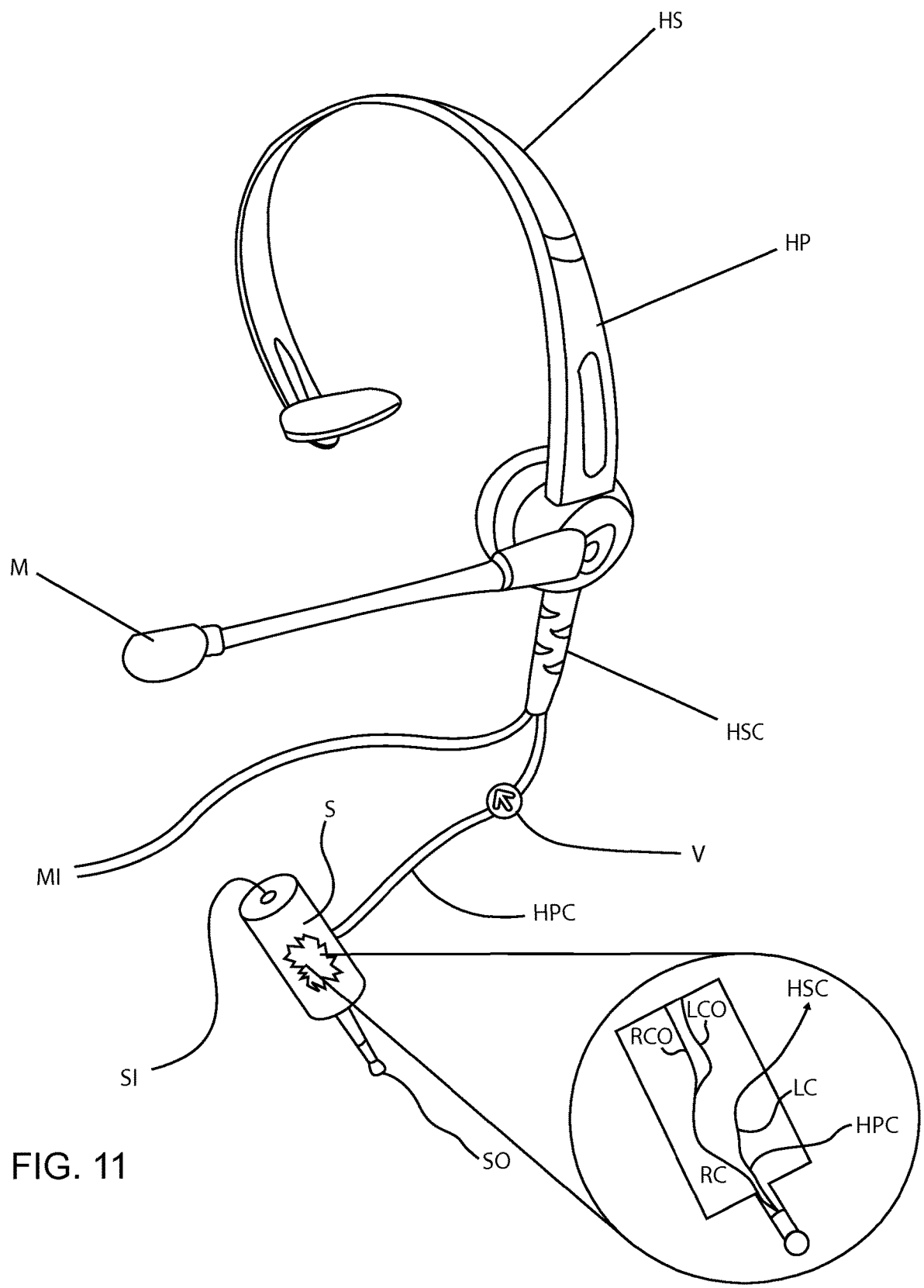
FIG. 11 shows a headset (HS) with a microphone (M), headset cord (HSC), microphone cord (MI) and headphone cord (HPC), whose headphone connection is equipped with a unique splitter plug (S), whose plug (SO) plugs into the headphone or speaker output of a computer, and then splits the left channel (LC) off to the headphone and the right channel (RC) off to both channels (LCO and RCO) of a stereo speaker system that plugs into the splitter's speaker input (SI), with the headset's microphone plugging into the computer's microphone input via cord MI.

The splitter S depicted in FIG. 11 can also be produced separately, in which case it would have the same one plug SO, along with two inputs—SI, which would supply both of its channels from one channel of plug SO, and a second, headphone input into which the headphone would be plugged. It can also be advantageous, in the iteration depicted in FIG. 11 and for other applications of this invention, to equip the headset with a volume control, which could be either in-line or located on the headset itself, or even potentially in the splitter, where one could potentially also have a second volume control—or a balance control—controlling the level of the signal supplied to input SI, e.g., to the speakers.

It can readily be seen that, while the various components involved in this invention are depicted as separate items connected by physical connections such as cables for the sake of clarity, this certainly need not be the case. It is possible for the various components to be contained in a single unit, or for the separate units to be connected wirelessly, or some combination of the two. Also, while the invention is depicted as being practiced with computer monitors, size is no limitation. It can readily be seen that the invention could be practiced on a cell phone or other personal electronic device and, at the other end of the size spectrum, on something as large as a stadium JumboTron, with vast crowds practicing the invention. In this latter application, wireless audio delivery would be particularly effective, for example via wireless headphones or cell phones.

What is claimed is:

1. A system for interactive immersive language training, general entertainment and role playing, the system comprising:
   at least one electronic display device designed to access and play at least one multi-media program content;
   at least one headset or other second sound system utilized for being audible only to a particular user;
   at least one speaker system adapted for being connected to the at least one electronic display device;
   at least one software program designed to selectively forward the at least one multi-media program content of a playback to the at least one speaker system and to the at least one headset or other second sound system utilized by a user;
   at least one media player program incorporated to the at least one electronic display device and at least one website for playing the at least one multi-media program content;
   and at least one electronic network operable to interconnect the at least one electronic display device and the at least one website;
   whereby the at least one electronic display device is adapted to access and play the at least one multi-media program content stored in a remote location by way of the at least one electronic network; and
   wherein the at least one media player program is adapted to control the speed parameters of the at least one multi-media program content;
   wherein the at least one multi-media program content contains speech;
   wherein the at least one media player program is adapted to display a transcript of such speech.

2. The system of claim 1 wherein the at least one electronic display device includes at least one central processing unit (CPU), at least one memory device, at least one input device and at least one output device.

3. The system of claim 1 wherein the at least one software program is designed to control a plurality of sonic characteristics of the at least one multi-media program content.

4. The system of claim 1 wherein the at least one multi-media program content is an audio dialog, a song, a movie, a television (TV) program, a radio program, an audio/video program present in the at least one electronic network, a video, a language the user wants to learn, a character/role the user wants to play.

5. The system of claim 1 wherein the at least one electronic display device is a desktop computer, a laptop computer, a tablet computer, a television (TV), a smart phone and/or mobile phone and/or other mobile device, a personal digital assistant (PDA), and/or a JumboTron.

6. The system of claim 1 wherein the at least one electronic network is selected from the group comprising Internet, a wired network, a wireless network or other network capable of connecting a display device with a website.

7. The system of claim 1 wherein the at least one website is associated to at least one database.

8. The system of claim 1 wherein the at least one electronic display device, the at least one headset or other second sound system and the at least one speaker system are controlled by way of remote controllers, keyboards, a combination of buttons/keys, touch screens and/or voice commands.

9. The system of claim 1 wherein the at least one headset or other second sound system includes a microphone.

10. The system of claim 9 wherein the at least one headset or other second sound system includes a microphone and a video camera;
wherein the at least one media player program is designed to record and review a performance by a user of the at least one multi-media program content forwarded to the at least one headset or other second sound system utilized by the user as well as the at least one multi-media program content.

11. The system of claim 10 wherein, in the process of recording and reviewing a user's performance, the at least one media player program is designed to superimpose or overlay one or more users' performances onto the at least one multi-media program content.

12. The system of claim 1 wherein the at least one media player program is designed to record and review the at least one multi-media program content.

13. The system of claim 1 wherein the at least one website includes at least one webpage having a vocabulary list utilized for language study.

14. The system of claim 1 wherein the at least one media player program includes at least one website address corresponding to at least one interactive webpage content.

15. The system of claim 14 wherein the at least one interactive webpage content is a game, cartoon, animation, playback and/or audio/video program.

16. The system of claim 1 wherein the at least one web site includes background music and sound effects which can be combined with the at least one multi-media program content.

17. The system of claim 1 wherein the at least one headset or other second sound system utilized by a user is wired to plug into a stereo jack and supply one stereo channel to said headset or other second sound system;
and such wiring is further fitted integrally with a mono or stereo jack to which the other stereo channel is supplied.

18. A system for interactive immersive language training, general entertainment and role playing, the system comprising:
at least one electronic display device designed to access and play at least one multi-media program content;
at least one headset or other second sound system utilized for being audible only to a particular user;
at least one speaker system adapted for being connected to the at least one electronic display device;
at least one software program designed to selectively forward the at least one multi-media program content of a playback to the at least one speaker system and to the at least one headset or other second sound system utilized by a user;
at least one media player program incorporated to the at least one electronic display device and at least one website for playing the at least one multi-media program content;
at least one electronic network operable to interconnect the at least one electronic display device and the at least one website;
whereby the at least one electronic display device is adapted to access and play the at least one multi-media program content stored in a remote location by way of the at least one electronic network; and wherein the at least one website includes at least one webpage designed to display a transcript of the speech of the user for matching the speech recognition performance of the user.

19. A system for interactive immersive language training, general entertainment and role playing, the system comprising:
at least one electronic display device designed to access and play at least one multi-media program content;
at least one headset or other second sound system utilized for being audible only to a particular user;
at least one speaker system adapted for being connected to the at least one electronic display device;
at least one software program designed to selectively forward the at least one multi-media program content of a playback to the at least one speaker system and to the at least one headset or other second sound system utilized by a user;
at least one media player program incorporated to the at least one electronic display device and at least one website for playing the at least one multi-media program content;
and at least one electronic network operable to interconnect the at least one electronic display device and the at least one website;
whereby the at least one electronic display device is adapted to access and play the at least one multi-media program content stored in a remote location by way of the at least one electronic network; and
wherein the at least one media player program is adapted to control the speed parameters of the at least one multi-media program content;
wherein the at least one headset or other second sound system includes a microphone;
wherein the at least one headset or other second sound system includes a microphone and a video camera;
wherein the at least one media player program is designed to record and review a performance by a user of the at least one multi-media program content forwarded to the at least one headset or other second sound system utilized by the user as well as the at least one multi-media program content;
wherein, in the process of recording and reviewing a user's performance, the at least one media player program is designed to superimpose or overlay one or more users' performances onto the at least one multi-media program content;
wherein the at least one software program and/or at least one media player program: generates or accesses a transcript of the lyrics or dialog of the multi-media program content and overlays that transcript on the multi-media program content as captions; and strips any or some voice content from the multi-media program content.

* * * * *